P. A. M. DELIEUVIN.
DEVICE FOR INCREASING THE ADHERENCE OF AGRICULTURAL TRACTORS TO THE SOIL.
APPLICATION FILED DEC. 29, 1917.

1,327,376. Patented Jan. 6, 1920.

Inventor
Paul Albert Maurice Delieuvin
by Lawrence Langner
Attorney

UNITED STATES PATENT OFFICE.

PAUL ALBERT MAURICE DELIEUVIN, OF NEUILLY-SUR-SEINE, FRANCE.

DEVICE FOR INCREASING THE ADHERENCE OF AGRICULTURAL TRACTORS TO THE SOIL.

1,327,376.   Specification of Letters Patent.   Patented Jan. 6, 1920.

Application filed December 29, 1917. Serial No. 209,492.

*To all whom it may concern:*

Be it known that I, PAUL ALBERT MAURICE DELIEUVIN, citizen of the Republic of France, residing at 15 Rue Louis Philippe, Neuilly-sur-Seine, Seine, in the Republic of France, have invented new and useful Improvements in Devices for Increasing the Adherence of Agricultural Tractors to the Soil, of which the following is a specification.

The numerous tests made with motor cultivators afford abundant proof of the fact that although such tractors may be used with advantage to replace animal traction for certain kinds of work and under certain conditions, their use cannot become as widespread as may be desired on account of the defects inherent in these machines, the two principal defects being an excessive weight and a lack of adherence.

In order to obtain the required adherence, the engineers have not hesitated to design very heavy machines carrying wheels of unusual size provided with cross-blades or paddles, and in this case it often happens that in the case of wet soil the tractor cannot go forward in spite of its cross-blades, this by reason of its great weight, and even when the soil is in good condition the tractor requires for its motion, still owing to such weight, more than 60 per cent. of the power supplied. This percentage rapidly increases as the condition of the ground becomes worse, and in this case even with 40 to 50 H. P. available it is impossible to carry on other than light work and the operation can only be performed in good weather.

It follows from these considerations that the ideal tractor is one which will afford the maximum adherence for a minimum weight.

The object of the present invention is to provide a tractive device of great adherence which is applicable to motor cultivator tractors and which allows of fulfilling the above conditions in the proper manner.

The accompanying drawings are given as examples of the present method.

Figure 1:
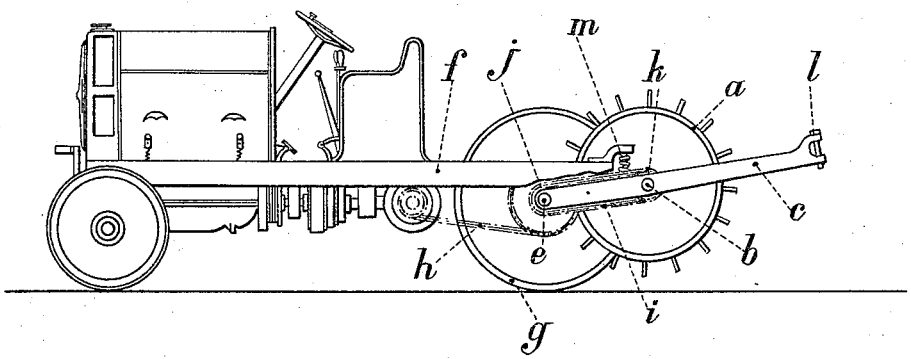
Figure 1 is a view in side elevation, of a tractor provided with a propulsive device of great adherence constructed according to the present invention, and it is here represented in the inoperative position.

In the constructional form represented in the drawing, the propulsive device of high adherence comprises essentially a paddle wheel $a$ keyed on the shaft $b$ which latter is mounted on a framework $c$ of extremely solid construction and which cannot be put out of shape, this frame being pivoted on the tractor axle $e$ between the side members of the truck.

The axle $e$ which carries the driving wheels $g$ of the tractor is driven by the two chains $h$, and this same axle drives the paddle wheel shaft $b$ by means of the two chains $i$ and the sprockets $j$ and $k$. The ratio of the two sprockets $j$ and $k$ is designed so that both the paddle wheel $a$ and the driving wheel $g$ are operated at the same peripheral speed.

The framework $c$ carries at the rear end a coupling hook $l$, and when out of use this frame is held in the raised position, as shown in Fig. 1, by the two springs $m$ attached at one end to the tractor truck and at the other to the framework of the device.

In this way, when in the inoperative position, the paddle wheel is kept removed from the ground by one or two inches and the tractor is thus entirely free to turn about rapidly, to proceed to the working point, or to effect traction upon the road.

Figure 2:
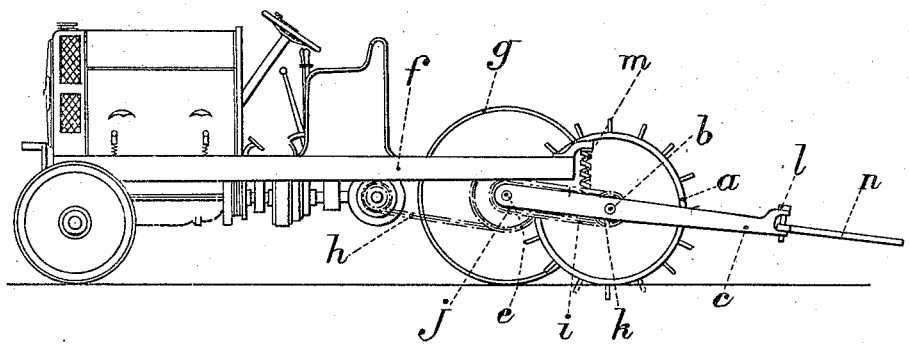
Fig. 2 is a similar view to the preceding, but with the device represented in the operative position.
Figure 3:
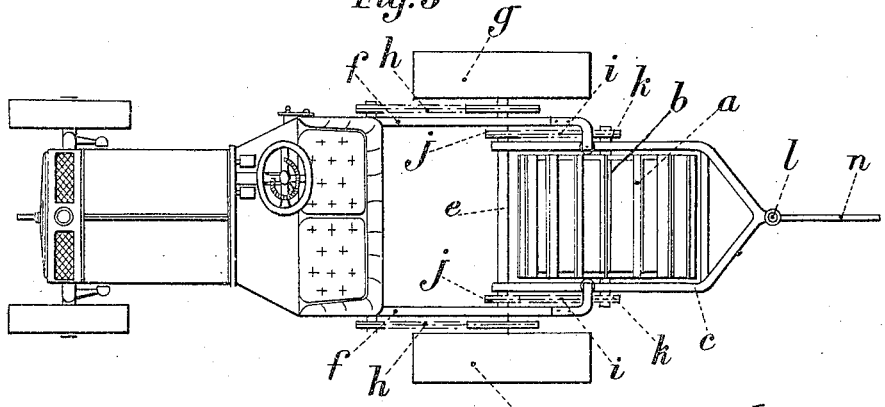
Fig. 3 is a plan view corresponding to Fig. 2.

When the agricultural implement (plow or the like) is attached to the coupling hook $l$ of the framework, if the coupling point on the implement is sufficiently low, the tractive force will cause the framework to pivot against the action of the springs $m$ and the paddle wheel will be brought in contact with the soil (Figs. 2 and 3). The paddles or blades will thus enter the ground with more or less force according to the tractive power employed, and this will greatly increase the adherence of the tractor on the ground. Owing to their design, the blades on the wheel $a$ will grip upon the soil and as they now act after the manner of a spade, they are not subject to retaining the earth and becoming clogged up as in the case of the cross cleats which are placed upon the driving wheels of a tractor, and these, especially in the case of sticky soil, become gradually covered with a layer of hardened earth and after a time are put out of use.

When the tractive pull ceases, the paddle wheel is lifted out of the ground by the action of the springs, and the framework occupies the raised position.

The device constructed according to the present invention can be adapted to all existing types of tractors.

The construction of extra light tractors can now be realized, and this will lessen the power used for running the tractor alone and will consequently leave a greater amount of power available at the coupling hook.

Owing to the automatic lift of the adherence device, the tractor acts when not at work, in the same way as the usual motor wagon and it allows of carrying out traction on the road or in fields, for the coupling piece can be attached under the automobile truck in case the adherence device is not used.

It will be observed that the adherence device can be brought in contact with the soil by a hand-operated mechanism, for instance in cases where it could be used to aid the car wheels in pulling out of ruts on the road.

The coupling hook is designed in such manner as to always allow the adherence device to be brought into contact with the soil whatever may be the angular position of the drawn point by means of a suitable height regulating device.

It is not always necessary to employ a paddle wheel construction as the adherence device, and the design of this part can be modified without going beyond the limits of the invention.

The present invention consists in principle in mounting upon the rear axle of a tractor, a swinging frame carrying a propulsive member having a strong adherence and operated by the engine of the tractor, which frame can be brought into action by a pivoting effect on said frame due to the tractive pull exerted on the implement to be drawn on the ground and on the other hand this frame is automatically thrown out of action immediately on the cessation of the tractive effect, by the pivoting of the frame in the opposite sense under the action of springs mounted in the proper manner.

Having now described my invention, what I claim as new and desire to secure by Letters Patent is:

1. The combination with an agricultural tractor provided with front and rear supporting wheels adapted to come in direct contact with the ground of an oscillating frame pivoted to the tractor, a strongly adherent wheel carried by said frame at the rear of the tractor in the space between the vertical planes of the rear wheels of the same, said strongly adherent wheel being adapted to come in direct contact with the ground, means for driving this wheel, means for yoking the oscillating frame to the trailed apparatus so that it may pivot downwardly and thus bring the wheel in contact with the soil through the resistance of the said trailed apparatus and means for pivoting upwardly the oscillating frame and lifting the wheel out of contact with the soil as soon as the strain of the trailed apparatus ceases to be exerted upon the oscillating frame.

2. An adherence device for agricultural tractors containing, in combination, a swinging frame pivoted on the driving axle of the tractor, a wheel having a strong adherence carried on said frame, means for operating said wheel as a driving wheel, springs for maintaining said frame in the raised position and said wheel out of contact with the ground, substantially as described and for the purpose set forth.

3. An adherence device for agricultural tractors containing, in combination, a swinging frame pivoted on the driving axle of the tractor, a wheel having a strong adherence carried on said frame, means for operating said wheel as a driving wheel, springs for maintaining said frame in the raised position and said wheel out of contact with the ground, and a coupling hook disposed upon the frame, substantially as described and for the purpose set forth.

In testimony whereof I have signed my name to this specification in the presence of two subscribing witnesses.

PAUL ALBERT MAURICE DELIEUVIN.

Witnesses:
 LOUIS MOSES,
 CHAS. P. PRESSLY.